(No Model.) 2 Sheets—Sheet 1.

W. C. WINFIELD.
MEASURING PUMP.

No. 248,378. Patented Oct. 18, 1881.

Witnesses:
Alli Long
A. Mc. Tanner

Inventor.
William C. Winfield,
By Paine, Grafton & Sodd
Attorneys.

(No Model.) 2 Sheets—Sheet 2.

W. C. WINFIELD.
MEASURING PUMP.

No. 248,378. Patented Oct. 18, 1881.

Witnesses:
A. M. Long
A. M. Tanner

Inventor.
William C. Winfield,
By Paine, Grafton & Dodd
Attorneys.

UNITED STATES PATENT OFFICE.

WILLIAM C. WINFIELD, OF HUBBARD, OHIO.

MEASURING-PUMP.

SPECIFICATION forming part of Letters Patent No. 248,378, dated October 18, 1881.

Application filed April 12, 1881. (No model.)

*To all whom it may concern:*

Be it known that I, WILLIAM C. WINFIELD, a citizen of the United States, residing at Hubbard, in the county of Trumbull and State of Ohio, have invented certain new and useful Improvements in Measuring-Pumps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of liquid-measures in which a pump raises the liquid from a supply-tank into a measuring-reservoir of a known capacity, the latter being provided with means for gaging or determining the precise amount of liquid drawn off therefrom.

The chief object of my invention is to provide simple, effective, and reliable means for measuring the liquid drawn off from the measuring-reservoir; and it consists of an overflow-tube which is adjustably fitted in a fixed discharge-tube entering the bottom of the reservoir. The adjustable overflow-tube has a graduated plate, which projects through the top of the reservoir and indicates the height or position of the overflow-tube within the reservoir, in order that the amount of liquid in the reservoir, which is subsequently drawn off from the latter through a discharge-faucet at the bottom of the reservoir, can be determined.

Certain minor details of construction and arrangement also constitute part of my invention.

Figure 1:
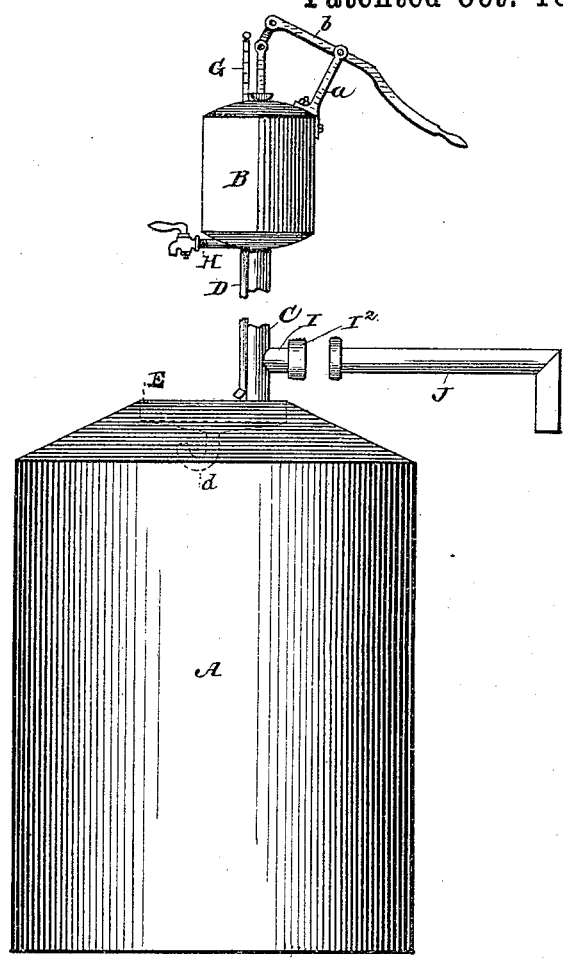
Figure 2:
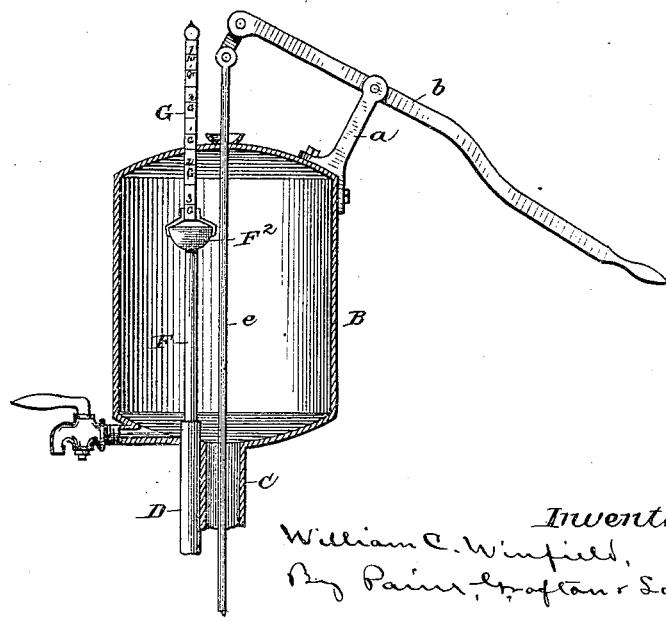
Figure 3:
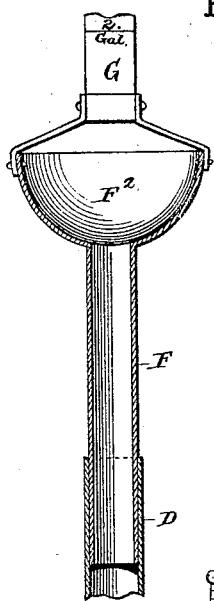
Figure 4:
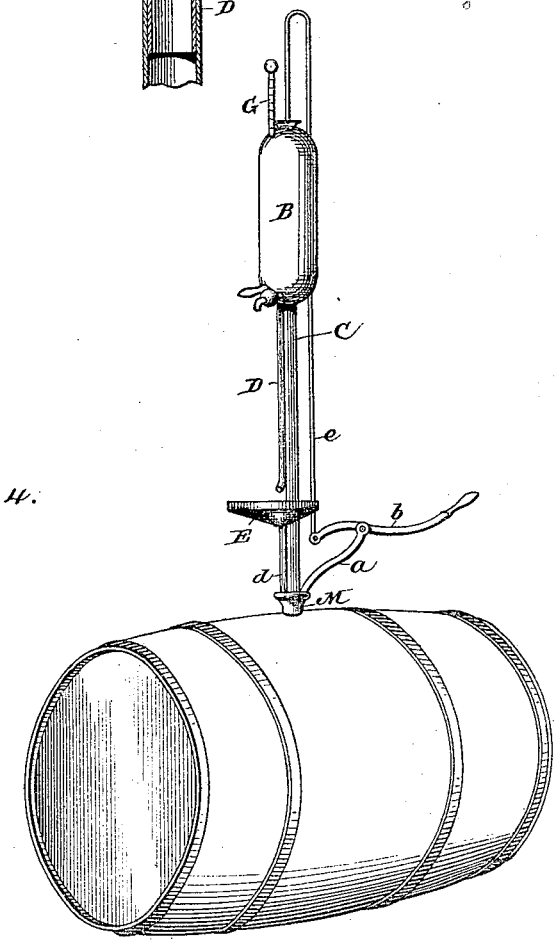

In the drawings, Figure 1 is an elevation of a liquid-measuring apparatus embodying my improvements. Fig. 2 is a vertical section of the measuring-reservoir, adjustable overflow-tube, and gage or scale plate projecting through the top of the reservoir. Fig. 3 is a detail view of the overflow-tube. Fig. 4 is a modification of my invention.

The letter A designates an oil or liquid tank, and B is a measuring-reservoir, which is connected with said tank by means of a pipe, C, extending down into the same. The measuring reservoir or vessel is of any known capacity, and is generally provided with a suitable bracket, $a$, in which is fulcrumed the operating-lever $b$ of an ordinary suction-pump. The pipe C constitutes the cylinder or working-barrel of the pump, and an ordinary valved piston carries a piston-rod, $e$, which rises through the pipe C and is connected with the lever $b$.

A tube, D, enters the bottom of the measuring-reservoir and is permanently fastened thereto. This tube terminates below directly over a tray or pan, E, on the cover of the liquid-tank. This tray supports the vessels which receive the liquid drawn from the measuring-reservoir, and it has a short bottom tube, $d$, for returning to the supply-tank the waste liquid that escapes through the overflow-tube and the drippings from the vessels which receive the liquid drawn off. The liquid is pumped into the measuring reservoir by operating the piston through the medium of the lever, and the amount in said reservoir can easily be determined or regulated by means of an adjustable over-flow tube, F. The latter is generally made of a seamless metal shell or tube, and is fitted into the discharge-tube D in such a manner that a liquid-tight joint is formed between the two tubes. An ordinary slip-joint will generally prove satisfactory, but it is also proposed to pass the overflow-tube through a packing box or cap on the top of the tube D.

The upper end of the tube F terminates in a funnel or flaring mouth, $F^2$, and a flat plate, G, rising therefrom or attached thereto, projects through the top of the measuring-reservoir. The plate G bears a graduated scale, which, in connection with a suitable pointer on the top of the reservoir, indicates the exact amount of liquid in said reservoir. The overflow-pipe is made of such a length that it can be raised to the highest level which the liquid assumes in the reservoir.

When the full capacity of the reservoir is to be measured out the overflow-tube is raised to the top of the reservoir and the reservoir pumped full until it overflows through the pipe F. The overflow will then be observed escaping from the pipe D into the tray E, and the contents of the reservoir is drawn off through the faucet of the discharge-pipe H. When a quantity of liquid less than the capacity of the reservoir is to be measured and drawn off the scale plate or rod G, and with it the overflow-pipe F, is lowered until the pointer indicates the desired quantity. The reservoir is filled until it overflows, and its contents (the desired quantity) is then drawn off, as before.

In order to adapt the pump which raises the oil or liquid from the tank into the reservoir as a means for filling said tank, I provide the working-barrel of the pump-piston with a screw-neck or opening, I, which receives an elbow-pipe, J, for filling the tank. The pump is for this purpose made detachable from the tank, and the measuring-reservoir can be attached to the pump and removable with it or attached to the tank. In the latter case the pump will enter the top of said reservoir. The object of the elbow-pipe J is to furnish a larger spout when the pump is transferred to a barrel for filling the tank, the discharge-pipe of the reservoir not allowing a sufficiently rapid flow for this purpose.

A screw-cap, I², closes the opening I when the pipe J is detached.

The overflow-pipe herein described is used as a gage altogether, though it can be employed as a discharge-pipe in addition to its use as an overflow-pipe. If it is set at its highest point and the reservoir filled until it overflows, and a receiving-vessel placed beneath the pipe D after the overflow has stopped, any desired quantity can be measured out and discharged through the pipe D by lowering the overflow-pipe the proper distance, as indicated by the scale.

It is proposed to use a measuring-pump of the form above set forth, in connection with an ordinary barrel, by slightly changing the construction and arrangement of the various parts.

Fig. 4 illustrates said modification. The pump, in the present instance, is carried by a plug or stopper, M, which fits into the bung-hole of the barrel, and the piston-rod, instead of being passed through the tube leading into the measuring-cylinder, is bent or curved so as to extend on the outside of said cylinder to permit it to be connected with its operating-lever fulcrumed in a projecting bracket or arm of the plug or stopper M.

The tray or pan E, instead of being fitted into the top of a supply-tank, is, in the proposed modification, connected with the barrel by a straight tube, d, running through the stopper or plug M.

I am aware that it is not broadly new to provide the measuring chamber or receiver of a liquid-measure with a vertically-adjustable overflow or gage tube which passes through the bottom of said receiver and leads directly into a supply-tank for returning the surplus liquid to the same.

I am also aware that a liquid-measuring apparatus comprising, essentially, a measuring-receptacle, a lift-pump, and a stationary return-tube terminating above a sink or support for the vessels to be filled, has heretofore been constructed. In this apparatus, however, the return-tube is stationary and has openings controlled by valves for causing the overflow to take place at various heights within the measuring-receptacle.

Having thus described my invention, what I claim as new, and desire to secure by Letters Patent, is—

1. The liquid-measuring pump herein described, consisting, essentially, of the measuring-vessel B, having a bottom discharge-faucet, an apertured top, and a stationary return-tube, D, the lift or supply pump, and the vertically-adjustable overflow-tube F, having its lower end fitted into the stationary return-tube, and provided with a graduated scale or indicator plate, G, extending through the apertured top of the measuring-vessel, as and for the purpose herein set forth.

2. In a liquid-measuring pump, the combination of the pump-barrel C, having a screw-neck, I, and supply-tube, J, and a suitable piston and rod, with the measuring-vessel B, having means for discharging the liquid therefrom, as and for the purpose set forth.

In testimony whereof I affix my signature in presence of two witnesses.

WILLIAM C. WINFIELD.

Witnesses:
GEORGE H. STEWART,
WARREN HIRST.